United States Patent
Verberkt et al.

(10) Patent No.: US 6,904,063 B2
(45) Date of Patent: Jun. 7, 2005

(54) METHOD, TRANSMITTER AND TRANSMISSION SYSTEM

(75) Inventors: Mark Henricus Verberkt, Eindhoven (NL); Sebastiaan Antonius Fransiscus Arnoldus Van Den Heuvel, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 719 days.

(21) Appl. No.: 09/790,188

(22) Filed: Feb. 22, 2001

(65) Prior Publication Data

US 2001/0021202 A1 Sep. 13, 2001

(30) Foreign Application Priority Data

Feb. 23, 2000 (EP) .............................................. 00200612

(51) Int. Cl.⁷ .................................................. H04J 3/02
(52) U.S. Cl. ......................... 370/537; 370/538; 370/540
(58) Field of Search ................................. 370/537, 532, 370/535, 538, 540, 493, 541

(56) References Cited

U.S. PATENT DOCUMENTS 6,463,059 B1 * 10/2002 Movshovich et al. ........ 370/389
6,519,259 B1 *  2/2003 Baker et al. ............. 370/395.4

FOREIGN PATENT DOCUMENTS

EP          0917355 A1    5/1999     ............ H04N/5/00

* cited by examiner

Primary Examiner—Phirin Sam

(57) ABSTRACT

A transmitter (10) for transmitting a multiplex signal (20) containing a number of tables with information about the signal (11) to a receiver (12), capable of selecting some or all of these tables (26) from the signal (20) and storing them on a table storage medium (22). The stored tables (27) are transmitted for example when the receiver (12) requests them, or when the information therein is updated. By storing these tables in the transmitter (10), the problem that the receiver has to wait for them to occur in the multiplex signal (10) is overcome.

12 Claims, 1 Drawing Sheet

METHOD, TRANSMITTER AND TRANSMISSION SYSTEM

Figure 1:
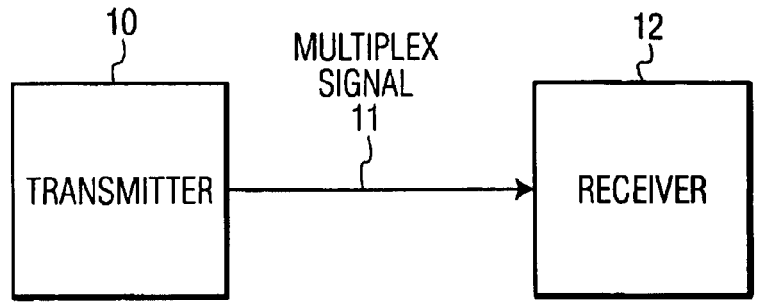

The invention relates to a method of transmitting a first multiplex signal as a second multiplex signal, the first multiplex signal containing a number of tables with information about this multiplex signal.

The invention further relates to a transmitter for transmitting a first multiplex signal as a second multiplex signal, the first multiplex signal containing a number of tables with information about this multiplex signal.

The invention further relates to a transmission system for transmitting a first multiplex signal as a second multiplex signal from a transmitter to a receiver, the first multiplex signal containing a number of tables with information about this multiplex signal.

When video, audio and other signals are transmitted, the signals are often coded according to the MPEG-2 standard. The signals to be transmitted are coded to so-called elementary streams. These streams are then combined (multiplexed) for transmission and thus form a transport stream. A transport stream is formed by packets. A packet may contain a part of an elementary stream and then has a program identifier (PID) of the respective elementary stream. With the aid of the PID the elementary stream may be reconstructed from the individual packets. A packet may also contain a table with information about the elementary streams, such as, for example, the association between a program and the associated elementary streams with the audio and video information of that program, or, for example, the entitlement management and control messages. The transmitter transmits the whole transport stream to a receiver, which can then reconstruct the elementary streams with the aid of the PIDs, can read tables and can reconstruct the desired signals for the user.

The tables are periodically repeated in the transport stream. The period may vary from 100 ms to 300 ms, depending on the table. Some of these tables are used in the interaction with the user. The Service Description Table (SDT) and the Event Information Table (EIT) for example, are used, for supplying the user with information about present and future programs. If the receiver needs these tables, in the present system he is to read these tables from the transport stream. This has the drawback that the receiver is to wait until these tables are repeated, so that the response time may become long.

It is an object of the invention to provide a method of the type defined in the opening paragraph in which the tables are rapidly available.

This object is achieved with the method in accordance with the invention in that a certain table is selected from the number of tables and this certain table is stored on a table storage medium. This causes the table to be rapidly available to receivers.

In a particular embodiment of the method, the second multiplex signal is made by removing the certain table from the first multiplex signal. This embodiment is advantageous in that bandwidth may now be saved, because this table is no longer transmitted periodically.

In a particular embodiment of the method a stored table is read from the table storage medium and the stored table is transmitted.

Also, it is an object of the invention to provide a transmitter of the type defined in the opening paragraph, by which the tables are rapidly available.

This object is achieved by the transmitter in accordance with the invention in that the transmitter includes a table storage medium, and a table selector arranged for selecting a certain table from the number of tables and storing this certain table on the table storage medium.

In a particular embodiment of the transmitter the table selector is arranged for producing the second multiplex signal by removing the certain table from the first multiplex signal.

In a particular embodiment of the transmitter comprises a table selector is arranged for reading a stored table from the table storage medium and transmitting the stored table.

In a particular embodiment of the transmitter the table reader is arranged for transmitting the stored table by adding the stored table to the second multiplex signal. This embodiment is advantageous in that a receiver now need not be adapted for receiving the stored table, because this stored table can now be read from the second multiplex signal in a known fashion.

In a particular embodiment of the transmitter the table reader is arranged for transmitting the stored table after a request to this end has been received. This embodiment is advantageous in that the stored table need not be transmitted if not required, so that bandwidth is saved.

In a particular embodiment of the transmitter the table reader is arranged for transmitting the stored table when the stored table relates to the same information as the certain table and the certain table is more recent than the stored table. This embodiment is advantageous in that a receiver now directly receives the latest information and need not itself verify whether its information is obsolete.

Also, it is an object of the invention to provide a transmission system in which the tables are rapidly available.

This object is achieved by the transmission system in accordance with the invention in that the transmitter includes a table storage medium, and a table selector is arranged for selecting a certain table from a number of tables and storing this certain table on the table storage medium.

These and other aspects of the invention are apparent from and will be elucidated with reference to the embodiment(s) described hereinafter.

Figure 2:
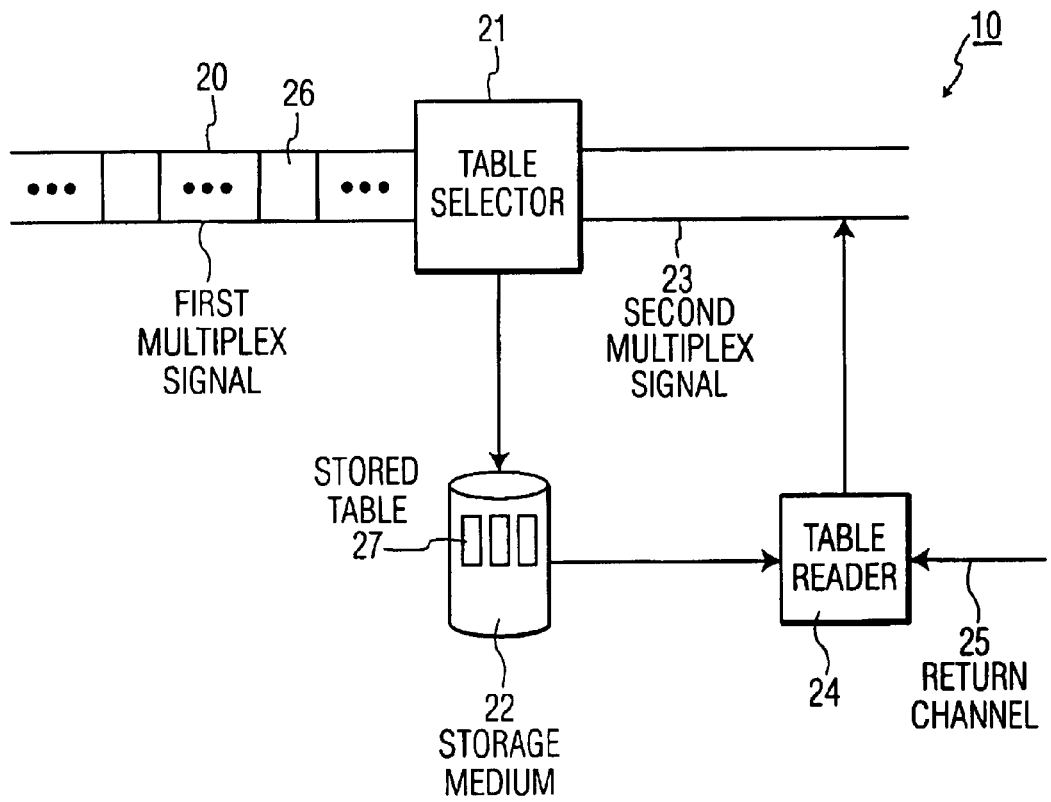

In the drawings:

FIG. 1 is a diagrammatic representation of a transmission system in accordance with the invention; and FIG. 2 is a diagrammatic representation of a transmitter in accordance with the invention.

In FIG. 1 is shown a transmission system for transmitting a multiplex signal 11 from a transmitter 10 to a receiver 12. The multiplex signal 11 contains a number of tables with information about the multiplex signal. As will become evident from the description of FIG. 2, the transmitter 10 includes a table storage medium and is arranged for selecting a certain table from the number of tables and storing this certain table on the table storage medium.

In FIG. 2, the transmitter 10 shown is used for transmitting a first multiplex signal 20 as a second multiplex signal 23. Only the components of interest to the invention are shown. The first multiplex signal 20 contains a number of tables with information about this multiplex signal. In the transmitter 10 the multiplex signal is an MPEG-2 transport stream. Examples of tables are in this situation the Service Description Table (SDT) and the Event Information Table (EIT).

The transmitter 10 may be realized in many forms, such as, for example, a residential gateway with In-Home Networking. This gateway receives from elsewhere a transport stream and conveys this transport stream to a plurality of receivers such as television sets. These television sets are mostly connected to the transmitter via a local network. Another possibility is that the transmitter reads a transport stream from a storage medium (not shown) and transmits same to a receiver.

The transmitter includes a table storage medium 22 and a table selector 21. The table selector 21 is arranged for selecting in the first multiplex signal 20 a certain table from the number of tables present therein and storing this certain table on the table storage medium 22. In a possible embodiment the table selector 21 produces the second multiplex signal 23 by removing the certain table 26 from the first multiplex signal 20.

The transmitter further includes a table reader 24. This table reader can read a stored table 27 from the table storage medium 22 and transmit the stored table 27. In a possible embodiment the table reader 24 can transmit the stored table 27 by adding same to the second multiplex signal 23.

It is possible to arrange the table reader 24 so that it transmits the stored table 27 after receiving a request to this end. The transmitter 10 may therefor be equipped with a return channel 25 through which this request may be received. For example, it is possible to implement for this purpose the technique as described in European patent application 00200132.9 (PHNL000013) from the same applicant as the present application. When this technique is implemented, a receiver sends through a return channel a request to the transmitter 10, which request has a number of criteria for selecting the tables fitting these criteria. In the present invention the table reader 24 can receive this request through the return channel 25 and meet this request by reading from the table storage medium 22 the tables that fit the stated criteria and transmit them.

In another possible embodiment the table selector 21 can first compare the certain table 26 with the stored tables to find out whether there is a stored table 27 that relates to the same information as the certain table 26. If that is the case, it is possible for the information in the certain table 26 to be unchanged with respect to the stored table 27. In that case nothing needs to be done. If the information in the certain table 26 is more recent, the table selector 21 can store this table on the table storage medium 22. The stored table 27, which relates to the same information, may then be overwritten.

In this embodiment it is possible to arrange the table selector 21 and the table reader 24 so that the table reader 24 now directly transmits the stored table 27. This is advantageous in that the receivers directly receive the latest version of the information in the stored table 27.

It may be obvious from the above that the embodiments described above may each be realized separately or in combination with one or more other embodiments.

What is claimed is:

1. A method to transmitting a first multiplex signal as a second multiplex signal, the first multiplex signal containing a number of tables with information about this multiplex signal wherein a certain table is selected from the number of tables and this certain table (26) is stored on a table storage medium, wherein a stored table is read from the table storage medium and the stored table is transmitted.

2. A method as claimed in claim 1, wherein the second multiplex signal is made by removing the certain table from the first multiplex signal.

3. A transmitter for transmitting a first multiplex signal as a second multiplex signal, the first multiplex signal containing a number of tables with information about this multiplex signal, wherein the transmitter comprises a table storage medium, and a table selector arranged for selecting a certain table from the number of tables and storing this certain table on the table storage medium, wherein a table reader is arranged for reading a stored table from the table storage medium and transmitting the stored table.

4. A transmitter as claimed in claim 3, wherein the table selector is arranged for producing the second multiplex signal by removing the certain table from the first multiplex signal.

5. A transmitter as claimed in claim 4, wherein the table reader is arranged for transmitting the stored table by adding the stored table to the second multiplex signal.

6. A transmitter as claimed in claim 4, wherein the table reader is arranged for transmitting the stored table after a request to this end has been received.

7. A transmitter as claimed in claim 4, wherein the table reader is arranged for transmitting the stored table when the stored table relates to the same information as the certain table and the certain table is more recent than the stored table.

8. A transmission system for transmitting a first multiplex signal as a second multiplex signal from a transmitter to a receiver, the first multiplex signal containing a number of tables with information about this multiplex signal, wherein the transmitter includes a table storage medium, and a table selector arranged for selecting a certain table from the number of tables and storing this certain table on the table storage medium, wherein a table reader (24) arranged for reading a stored table from the table storage medium and transmitting the stored table.

9. A transmission system as claimed in claim 8, wherein the table selector is arranged for producing the second multiplex signal by removing the certain table from the first multiplex signal.

10. A transmission system as claimed in claim 9, wherein the table reader is arranged for transmitting the stored table by adding the stored table to the second multiplex signal.

11. A transmission system as claimed in claim 9, wherein the table reader is arranged for transmitting the stored table after a request to this end has been received.

12. A transmission system as claimed in claim 9, wherein the table reader is arranged for transmitting the stored table when the stored table relates to the same information as the certain table and the certain table is more recent than the stored table.

* * * * *